US009198032B2

(12) United States Patent
Serravalle

(10) Patent No.: US 9,198,032 B2
(45) Date of Patent: Nov. 24, 2015

(54) CONNECTION IDENTIFIER SYSTEM AND METHOD

(75) Inventor: Francesca Serravalle, London (GB)

(73) Assignee: NEC CORPORATION, Tokyo (JP)

( * ) Notice: Subject to any disclaimer, the term of this patent is extended or adjusted under 35 U.S.C. 154(b) by 955 days.

(21) Appl. No.: 12/733,121

(22) PCT Filed: Aug. 12, 2008

(86) PCT No.: PCT/JP2008/064676
§ 371 (c)(1),
(2), (4) Date: Feb. 12, 2010

(87) PCT Pub. No.: WO2009/022750
PCT Pub. Date: Feb. 19, 2009

(65) Prior Publication Data
US 2010/0142407 A1   Jun. 10, 2010

(30) Foreign Application Priority Data
Aug. 15, 2007  (GB) .................................. 0715940.3

(51) Int. Cl.
*H04L 12/28* (2006.01)
*H04W 8/26* (2009.01)
(Continued)

(52) U.S. Cl.
CPC ................ *H04W 8/26* (2013.01); *H04W 36/08* (2013.01); *H04W 76/02* (2013.01); *H04W 92/045* (2013.01)

(58) Field of Classification Search
CPC ....... H04W 8/26; H04W 36/08; H04W 76/02; H04W 92/045

USPC ................... 370/254, 331, 352, 395.52, 401; 455/433, 445, 435.2
See application file for complete search history.

(56) References Cited

U.S. PATENT DOCUMENTS 6,615,260 B1 * 9/2003 Honda et al. .................. 709/224
6,684,251 B1   1/2004 Qui et al.
(Continued)

FOREIGN PATENT DOCUMENTS

CN    1367968 (A)    9/2002
CN    1607781 (A)    4/2005
(Continued)

OTHER PUBLICATIONS

"Technical Specification Group Radio Access Network; Evolved Universal Terrestrial Radio Access Network (E-UTRAN), S1 Application Protocol (S1AP), (Release 8), 3GPP TS 36.413, vol. 1.0" 3rd Generation Partnership Project, Jun. 2007, pp. 1-33, XP002530743.
(Continued)

*Primary Examiner* — Ajay Cattungal
(74) *Attorney, Agent, or Firm* — Sughrue Mion, PLLC

(57) ABSTRACT

A method and system are proposed for establishing a requested connection between a source node and a destination node in a telecommunications network. The system and method are described in relation to a 3GPP network, but are applicable to other types of networks. The method includes generating a source application identifier for the connection within the source node, retrieving a source node identifier for the source node and transmitting the source application identifier and the source node identifier to the destination to provide a source connection identifier for the requested connection between the source node and the destination node.

21 Claims, 6 Drawing Sheets

(51) Int. Cl.
*H04W 36/08* (2009.01)
*H04W 76/02* (2009.01)
*H04W 92/04* (2009.01)

(56) References Cited

U.S. PATENT DOCUMENTS

| | | | |
|---|---|---|---|
| 7,493,623 | B2 | 2/2009 | Ruutu |
| 7,606,929 | B2 | 10/2009 | Gbadegesin et al. |
| 7,912,471 | B2 | 3/2011 | Kodikara Patabandi et al. |
| 7,965,690 | B2 | 6/2011 | Hancock et al. |
| 2001/0009854 | A1* | 7/2001 | Kaibel et al. ............... 455/445 |
| 2003/0088702 | A1* | 5/2003 | Iwata et al. ................. 709/245 |
| 2004/0015593 | A1 | 1/2004 | Krembs et al. |
| 2004/0205769 | A1 | 10/2004 | Ruutu |
| 2005/0041671 | A1* | 2/2005 | Ikeda et al. ............. 370/395.52 |
| 2005/0059398 | A1* | 3/2005 | Jaupitre et al. ............ 455/435.2 |
| 2005/0198310 | A1* | 9/2005 | Kim et al. .................... 709/227 |
| 2006/0245562 | A1* | 11/2006 | Miller et al. ............. 379/114.01 |
| 2007/0025342 | A1* | 2/2007 | Obata ........................... 370/352 |
| 2007/0104164 | A1 | 5/2007 | Laroia et al. |
| 2007/0143429 | A1* | 6/2007 | Venkataraman et al. ..... 709/206 |
| 2008/0247361 | A1* | 10/2008 | Jung et al. ..................... 370/331 |
| 2009/0129342 | A1* | 5/2009 | Hwang et al. ................. 370/331 |
| 2011/0165880 | A1 | 7/2011 | Kodikara Patabandi et al. |
| 2011/0165881 | A1 | 7/2011 | Kodikara Patabandi et al. |
| 2011/0165882 | A1 | 7/2011 | Kodikara Patabandi et al. |
| 2011/0165883 | A1 | 7/2011 | Kodikara Patabandi et al. |
| 2011/0165884 | A1 | 7/2011 | Kodikara Patabandi et al. |
| 2011/0165885 | A1 | 7/2011 | Kodikara Patabandi et al. |
| 2011/0165886 | A1 | 7/2011 | Kodikara Patabandi et al. |
| 2011/0183700 | A1 | 7/2011 | Kodikara Patabandi et al. |
| 2011/0190001 | A1 | 8/2011 | Kodikara Patabandi et al. |
| 2012/0028717 | A1* | 2/2012 | Hirose et al. ................... 463/42 |
| 2012/0227035 | A1* | 9/2012 | Obasanjo et al. ............. 717/176 |

FOREIGN PATENT DOCUMENTS

| | | |
|---|---|---|
| CN | 1748390 (A) | 3/2006 |
| JP | 2007-506294 (A) | 3/2007 |
| JP | 2009-512357 (A) | 3/2009 |
| JP | 2009-522893 (A) | 6/2009 |

OTHER PUBLICATIONS

NEC, RAN Working Group 3 meeting #57, R3-071344, Athens, Greece, Aug. 20-24, 2007, "Discussion and proposal for the AP ID handling".
Alcatel-Lucent: "Identification of Control Plane Connections" 3GPP Draft; R3-070224_PROT, 3rd Generation Partnership Project (3GPP), Mobile Competence Centre; 650, Route Des Lucioles; F-06921 Sophia-Antipolis Cedex; France, Feb. 7, 2007, pp. 1-2, XP050161151.
"Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.1.0 Release 8); ETSI TS 136 300" ETSI Standards, LIS, Sophia Antipolis Cedex, France, vol. 3-R2, No. V8.1.0, Jun. 1, 2007, pp. 1-107, XP014038500, ISSN: 000-0001.
Chinese Office Action dated Jul. 2, 2012, with English translation.
Japanese Office Action dated May 9, 2012, with partial English translation.
Japanese Office Action dated Mar. 12, 2014 with a partial English translation.
"Addressing on S1-C and X2-C", Ericsson, R3-070472, 3GPP TSG-RAN WG3 #55. St. Louis, US. Feb. 12-16, 2007.
Japanese Office Action dated Aug. 14, 2013.
3GPP TSG RAN WG3 Meeting #54 Riga, Lativa, Nov. 6-10, 2006, R3-061811, C-Plane Signaling Transport, pp. 1-5.
3GPP TSG-RAN3#55, Feb. 2007, R3-070081, NTT DoCoMo, "The Necessity of SI Context Setup Procedure", pp. 1-5.

* cited by examiner

CONNECTION IDENTIFIER SYSTEM AND METHOD

TECHNICAL FIELD

The present invention relates to the management of connections in telecommunications networks, particularly but not exclusively networks operating according to the 3GPP standards or equivalents or derivatives thereof.

RELATED ART

In telecommunications networks, connections may be established between components or nodes in the network. Connections may be established, for example, between two base station (eNodeB) components in the network or between an eNodeB and a gateway component in the telecommunications network. An example of a gateway component may include an Access Gateway, which may be a Mobility Management Entity (MME) or a System Architecture Evolution (SAE) gateway. Connections may be established when a new mobile communication device or User Equipment (UE) connects to an eNodeB, for example when a mobile device is switched on or when a mobile device transfers from one eNodeB to a different eNodeB in the network. Similarly, connections may be established when an eNodeB component communicates with a new gateway device in the network.

Before establishing a connection, the source node, for example an eNodeB, generates an application identifier for the connection (eNB S1-AP). The application identifier is unique to the connections currently active within the source node. That is, the source node may handle a plurality of connections, each having its own application identifier.

The application identifier is transmitted to the destination node with the initial connection request message, requesting the establishment of a connection. In response, the destination node transmits a reply message to establish the connection. The reply message includes both the application identifier (eNB S1-AP) generated by the source node and an application identifier generated by the destination node. The application identifier for the destination node may be in the form of a Target eNodeB identifier (eNB S1-AP) if the destination node is another eNodeB or an MME identifier (MME S1-AP) if the destination node is an MME. The application identifier generated by the destination node is unique to the connections currently active in the destination node. That is, the destination node may handle a plurality of connections, each having its own application identifier.

It has been appreciated that, although the application identifiers are unique within the source and destination nodes that generate the identifiers, the application identifiers do not necessarily uniquely identify the connection at the receiving component. This may be problematic, for example, if two connection request messages for two newly-connecting mobile devices are received at an MME from two different eNodeBs where the two connection request messages have by chance been assigned the same eNB S1-AP identifier. A problem may also arise if S1-AP Handover Request messages are received at an eNodeB from two different MMEs which have assigned the same MME S1-AP identifier to the requests. Similarly, a problem may arise if an eNodeB component receives X2-AP Handover Request messages from two other eNodeB components which have by chance assigned the same Source XP-AP identifier to the requests. A more detailed description of these situations and the associated problems is provided below.

The various acronyms applicable in the telecommunications network will of course be familiar to those skilled in the art, but a glossary is appended for the benefit of lay readers. Although for efficiency of understanding for those of skill in the art the invention will be described in detail in the context of a UTRAN (Evolved Universal Terrestrial Radio Access Network) system, the principles of the identifier system can be applied to other systems, e.g. 3G, CDMA (Code Division Multiple Access) or other wireless systems in which base station components, such as eNodeB components, communicate with each other or with other devices, such as gateway devices, in the telecommunications network, with the corresponding elements of the system changed as required. The present methods and systems may also be implemented in wireless local area networks (WLANs) or other local or wide area networks (LANs or WANs).

DISCLOSURE OF INVENTION

According to one aspect, the invention provides a method for establishing a requested connection between a source node and a destination node in a telecommunications network comprising:

generating a source application identifier for the connection within the source node;

retrieving a source node identifier for the source node; and transmitting the source application identifier and the source node identifier to the destination node to provide a source connection identifier for the requested connection between the source node and the destination node.

Hence the identifier for the connection between the source node and the destination node includes both an application identifier and an identifier of the source node itself. The application identifier may uniquely identify the connection within the source node. This identifier may be generated by an application identifier generator, which may be associated with the application that sets up and manages connections from the source node. Application identifiers may not be unique across different nodes in the network, that is two source nodes establishing a connection may use the same application identifier in relation to each of their connections. Adding a further identifier based on the source node itself may differentiate the new connection from other connections being established by other nodes in the network. The source node identifier may be stored in the source node and retrieved from memory or the identifier may be generated before being incorporated into the source connection identifier.

A connection between source and destination nodes in the network may also be referred to as a "context" and a connection identifier may be referred to as a "context identifier".

In one embodiment, the method may further comprise receiving a connection reply message, the reply message comprising a destination connection identifier, wherein the destination connection identifier comprises a destination application identifier identifying a connection within the destination node and a destination node identifier.

In some implementations, it may be considered sufficient to provide an identifier of the source node in the connection request message.

The source node identifier may be unique within the mobile telecommunications network, for example within a single Public Land Mobile Network (PLMN) network, or the source node identifier may be globally unique. In one embodiment, the source node identifier may include an identifier of at least a portion of the source network (for example an identifier of the PLMN network in which the source node is operating) and an identifier of the source node within the at least a portion of the source network (for example an identifier of the source node that is unique within the PLMN network).

It will be clear to one skilled in the art that the methods described may be implemented between a number of different types of components in a mobile network and over a variety of different interfaces. However, in a specific embodiment, the source and/or destination nodes may comprise base stations, for example eNodeB components. The source and/or destination components may also comprise gateway nodes, such as MME components. The connection may be established over an S1 or X2 interface depending on the source and destination components for the particular connection.

According to another aspect, the invention provides apparatus comprising a telecommunications network, the network comprising a plurality of nodes, wherein a connection may be established between two nodes in the telecommunications network using a connection request message, the network comprising:

a source node for initiating a connection to a destination node in the telecommunications network, the source node comprising:

means for generating a source application identifier;

means for storing a source node identifier; and means for transmitting the source application identifier and the source node identifier to the destination node to provide a source connection identifier for the requested connection between the source node and the destination node, the network further comprising a destination node comprising:

means for receiving the source application identifier and the source node identifier from the source node to form a source connection identifier for the requested connection between the source node and the destination node;

means for generating a connection reply message; and means for transmitting the connection reply message to the source node via the telecommunications network.

According to another aspect, the invention provides apparatus comprising a source node for originating a connection to a destination node of a telecommunications network, the source node comprising:

means for generating a source application identifier;

means for storing a source node identifier; and means for transmitting the source application identifier and the source node identifier to the destination node to provide a source connection identifier for the requested connection between the source node and the destination node.

According to another aspect, the invention provides apparatus comprising a destination node for terminating a connection from a source node of a telecommunications network, the destination node comprising:

means for receiving a source application identifier and a source node identifier to form a source connection identifier for the requested connection between the source node and the destination node;

means for generating a connection reply message; and means for transmitting the connection reply message to the source node.

According to another aspect, the invention provides a method of configuring a telecommunications network comprising:

defining a range of application identifiers for identifying connections in the telecommunications network;

dividing the range of application identifiers into a plurality of sub-ranges of application identifiers; and allocating a sub-range of application identifiers to each of a plurality of nodes in the network;

wherein each sub-range of identifiers is allocated so that each node in the network has a plurality of application identifiers that is distinct within the network.

According to another aspect, the invention provides method of establishing a connection between a source node and a destination node in a telecommunications network, wherein a connection request message is used to establish a connection and wherein the connection request message comprises an application identifier selected from a range of application identifiers used in the network, the method comprising:

storing a sub-range of application identifiers for identifying connections in the telecommunications network;

retrieving an application identifier selected from the sub-range of application identifiers;

generating a connection establishment request message incorporating the selected application identifier; and transmitting the connection establishment request message to the destination node.

According to a further aspect, the invention provides a method of establishing a connection from a source node at a destination node in a telecommunications network comprising:

receiving a connection request message from the source node, the connection request message including an application identifier selected from a range of application identifiers used in the network;

storing a source node identifier for identifying a connection in the telecommunications network;

generating a connection establishment reply message incorporating the selected application identifier; and transmitting the connection establishment reply message to the source node.

Preferred embodiments of the method may include defining a network identifier for the telecommunications network, wherein the connection establishment request message further comprises the network identifier.

The method may further include monitoring which application identifiers have been used for previously-established connections and avoiding using those application identifiers for establishing new connections, particularly if the previously-established connections are still active in the node. Application identifiers may be selected by cycling through a list of available application identifiers or by selecting any identifier that is not currently in use for a connection.

According to a further aspect, there is provided a method for establishing a connection between a source node and a destination node in a telecommunications network by transmitting a connection request message, the message having a source application identifier for the connection within the source node; and wherein the message further comprises a source node identifier for the source node.

According to a further aspect, there is provided a system for establishing a connection between a source node and a destination node in a telecommunications network by transmitting a connection request message, the message having a source application identifier for the connection within the source node; and wherein the message further comprises a source node identifier for the source node.

According to a further aspect, there is provided a method for establishing a connection at a destination node from a source node in a telecommunications network by receiving a connection request message, the message having a source application identifier for the connection within the source node; and wherein the message further comprises a source node identifier for the source node.

According to a further aspect, there is provided a system for establishing a connection at a destination node from a source node in a telecommunications network by receiving a connection request message, the message having a source application identifier for the connection within the source node; and wherein the message further comprises a source node identifier for the source node.

The above two aspects may further include receiving a second connection request message from a second source node, the message having a second source application identifier; and wherein the second message further comprises a source node identifier for the second source node, the source node identifier for the source node and the second source node identifier for the second source node being mutually distinct.

In one embodiment of the above two aspects, the source node and the second source node each comprise an eNodeB and the destination node comprises an MME.

In a second embodiment of the above two aspects, the source node and the second source node each comprise an MME and the destination node comprises an eNodeB.

In a third embodiment of the above two aspects, the source node, the second source node and the destination node each comprise an eNodeB.

Aspects of the invention are set out in the independent claims. Preferred features of the aspects are set out in the dependent claims. The invention provides, for all methods disclosed, corresponding computer programs or computer program products for execution on corresponding equipment, the equipment itself (user equipment, nodes, networks or components thereof) and methods of configuring and updating the equipment. Features of one aspect may be applied to other aspects.

BRIEF DESCRIPTION OF THE DRAWINGS

An embodiment of the invention will now be described, by way of example, with reference to the accompanying drawings in which.

BEST MODE FOR CARRYING OUT THE INVENTION

Overview

The following description sets out a number of specific embodiments of the method and system claimed herein. It will be clear to one skilled in the art that variations of the features and method steps may be provided and that many of the features described are not essential to the invention, the scope of which is defined by the claims.

Figure 1:
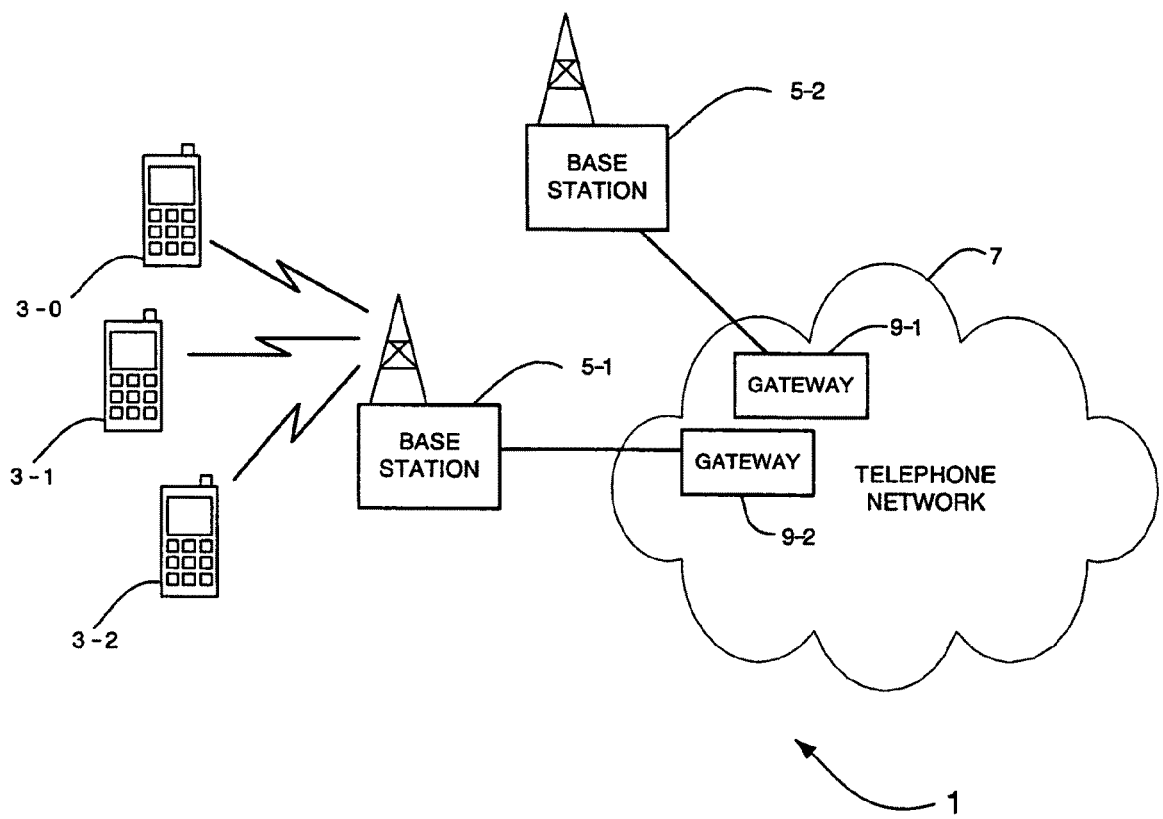
FIG. 1 schematically illustrates a mobile telecommunication system of a type to which the embodiment is applicable.

FIG. 1 schematically illustrates a mobile (cellular) telecommunication system 1 in which users of mobile (or cellular) telephones (MT) 3-0, 3-1, and 3-2 can communicate with other users (not shown) via one of the base stations 5-1 or 5-2 and a telephone network 7. The telephone network 7 includes a plurality of components including gateway components 9-1, 9-2. It will be appreciated by the skilled person that the each base station 5-1, 5-2 may connect to the telephone network 7 via either gateway 9-1, 9-2 and that both base stations 5-1, 5-2 may connect via the same gateway 9-1, 9-2. Similarly, each mobile telephone 3 may connect to the telephone network 7 via either base station 5 and that both mobile telephones 3 may connect via the same base station 5.

In this embodiment, the base stations 5 use an orthogonal frequency division multiple access (OFDMA) technique in which the data to be transmitted to the mobile telephones 3 is modulated onto a plurality of sub-carriers. Other well known data transmission techniques may also be used. When a mobile telephone 3 enters the network 7, for example by being switched on, a connection is established between the mobile telephone 3 and a base station 5 and between the base station 5 and a gateway device 9. This enables communication between the mobile telephone 3 and other components in the network 7.

Also, when a mobile telephone 3 moves from the cell of a source base station (e.g. base station 5-1) to a target base station (e.g. base station 5-2), a handover procedure (protocol) is carried out in the source and target base stations 5 and in the mobile telephone 3, to control the handover process. The handover is enabled by the establishment of a connection between the source and target base stations 5. As part of the handover process, the gateway device 9-1, 9-2 via which communications from a mobile telephone 3 are transmitted to the telephone network may change. Alternatively, the gateway device 9-1, 9-2 through which communications are transmitted may remain the same, but the base station 5-1, 5-2 to which the mobile device is connection may change. These transfers are also enabled by the establishment of connections between the base stations 5 and the gateways 9.

Base Station

Figure 2:
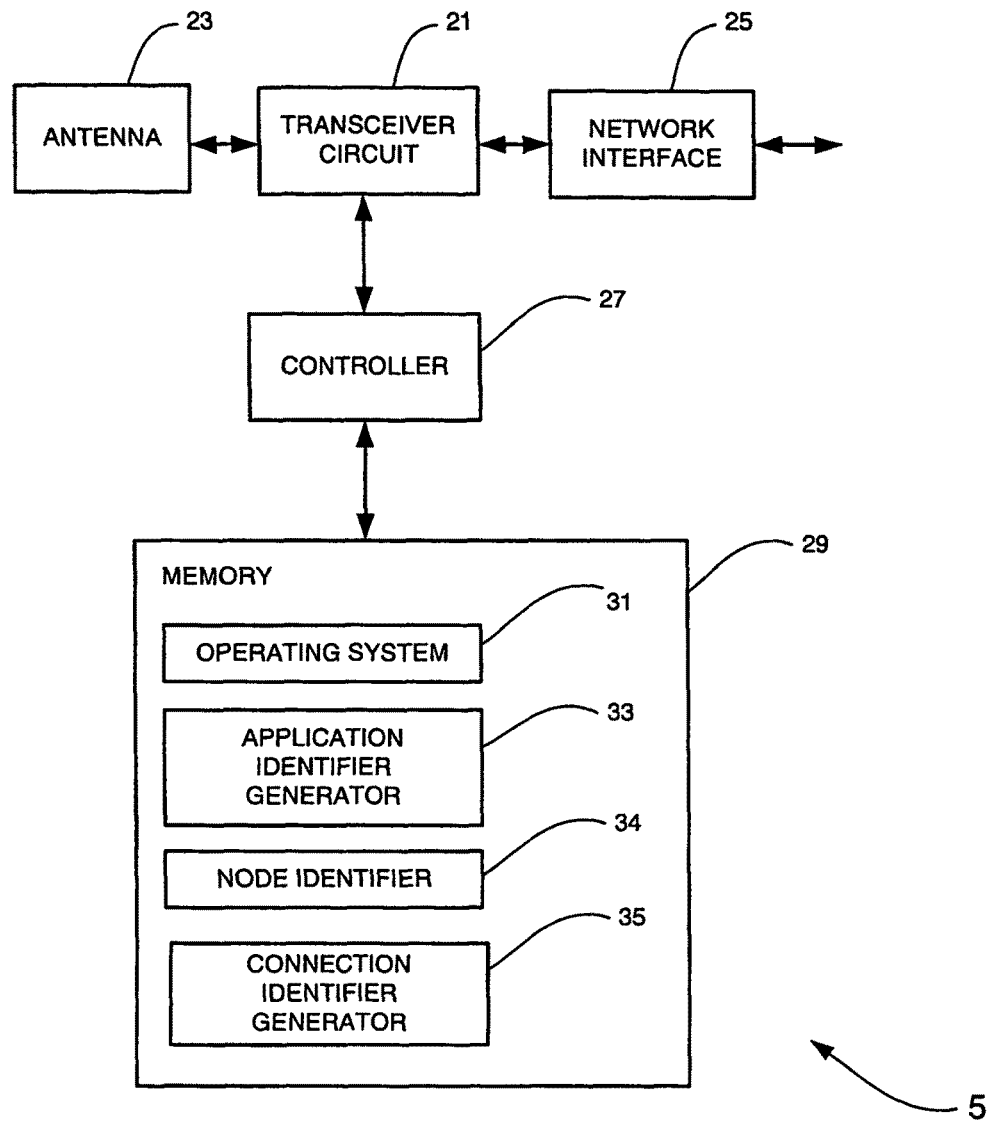
FIG. 2 schematically illustrates a base station forming part of the system shown in FIG. 1.

FIG. 2 is a block diagram illustrating the main components of each of the base stations 5 used in this embodiment. As shown, each base station 5 includes a transceiver circuit 21 which is operable to transmit signals to and to receive signals from the mobile telephones 3 via one or more antennae 23 and which is operable to transmit signals to and to receive signals from the telephone network 7 via a network interface 25. The network interface 25 includes an S1 network interface for communicating with network components, such as gateway nodes, using the S1 protocol. The network interface 25 also includes an X2 interface for communicating with other base station components using the X2 protocol. A controller 27 controls the operation of the transceiver circuit 21 in accordance with software stored in memory 29. The software includes, among other things, an operating system 31, an application identifier generator 33 and a connection identifier generator 35 which may also be referred to as a context identifier generator. The memory stores a node identifier 34 and in some embodiments also stores a network identifier for the network with which the base station is associated. The operation of the application identifier generator 33 and the connection identifier generator 35 are described below.

Gateway

Figure 3:
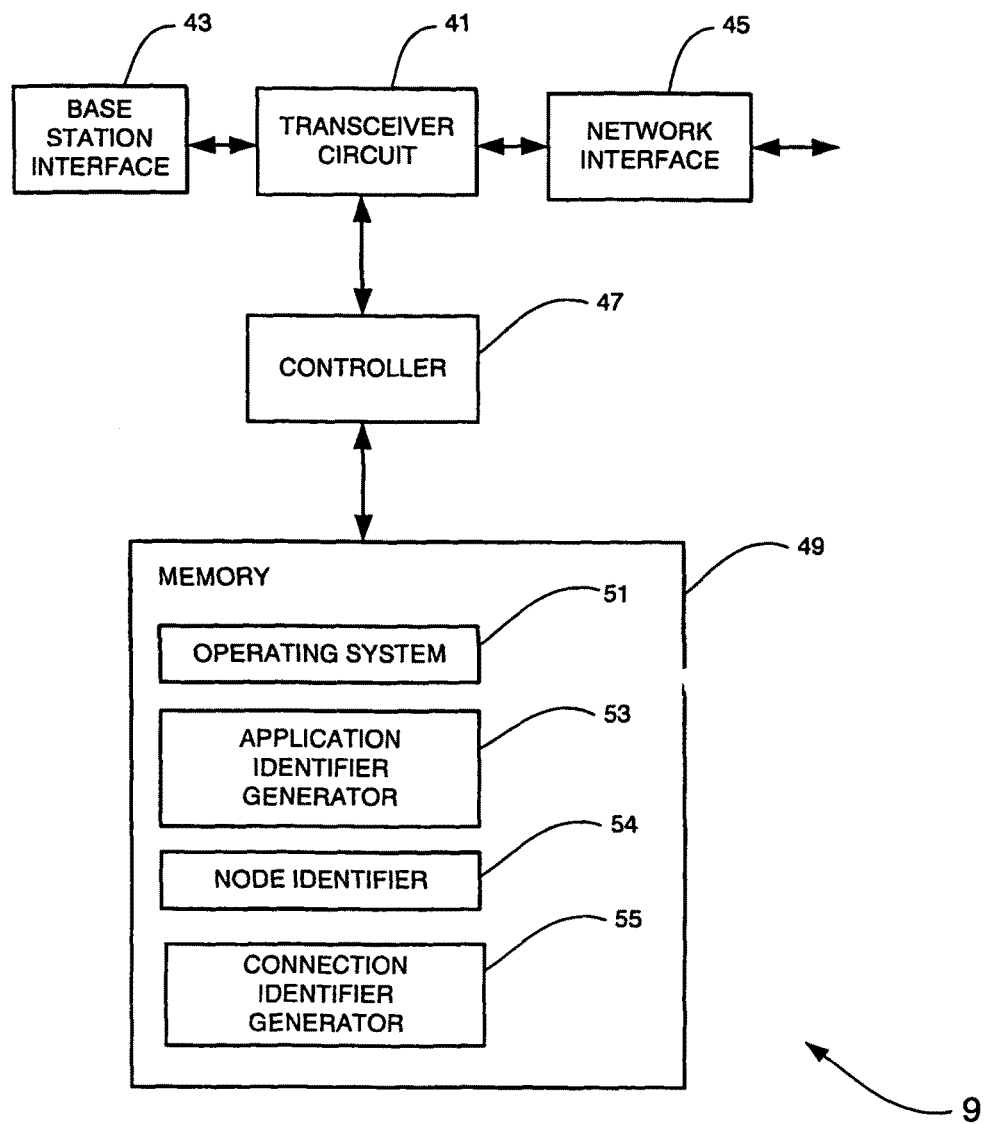
FIG. 3 schematically illustrates a gateway device forming part of the system shown in FIG. 1.

FIG. 3 is a block diagram illustrating the main components of each of the gateway components 9 used in this embodiment. As shown, each gateway 9 includes a transceiver circuit 41, which is operable to transmit signals to and to receive signals from at least one base station 5 via a base station interface 43 and which is operable to transmit signals to and receive signals from the rest of the telephone network 7 via a network interface 45. A controller 47 controls the operation of the transceiver circuit 41 in accordance with software stored in memory 49. The software includes, among other things, an operating system 51, an application identifier generator 53 and a connection identifier generator 55, which may also be referred to as a context identifier generator. The memory stores a node identifier 54 and in some embodiments also stores a network identifier for the network with which the base station is associated. The operation of the application identifier generator 53 and the connection identifier generator 55 are described below.

In the above description, both the base stations 5 and the gateways 9 are described for ease of understanding as having respective discrete modules which operate according to the methods described herein. Whilst the features may be provided in this way for certain applications, for example where an existing system has been modified to implement the invention, in other applications, for example in systems designed with the inventive features in mind from the outset, these features may be built into the overall operating system or code and so the modules described above may not be discernable as discrete entities.

The following description will use the nomenclature used in the Long Term Evolution (LTE) of UTRAN. Therefore, the mobile telephone 3 will be referred to as a UE, each base station 5 will be referred to as an eNodeB (or eNB) and each gateway component will be referred to as an MME. The protocol entities used in LTE have the same names as those used in UMTS (Universal Mobile Telecommunication System) except for the Radio Link Control (RLC) entities which, under LTE, are called the Outer ARQ (Automatic Repeat Request) entities. The Outer ARQ entities of LTE have substantially the same (although not identical) functionality to the RLC entities of UMTS.

Error Scenarios

As set out above, in prior art systems application identifiers sent with the context establishment request messages do not necessarily uniquely identify the context at the receiving component. Details of identifiers that are sent within context set-up messages in this embodiment are provided below. However, examples of situations in which a problem may arise are first discussed in more detail.

A transport protocol connection, such as a Stream Control Transmission Protocol (SCTP) connection, may carry signals relating to different UEs. In order to forward the signalling internally to the correct UE context manager in the receiving node, application routing information is included in the S1 or X2 application (AP) messages. This will be further explained and illustrated with reference to FIGS. 4a and 4b.

Figure 4A:
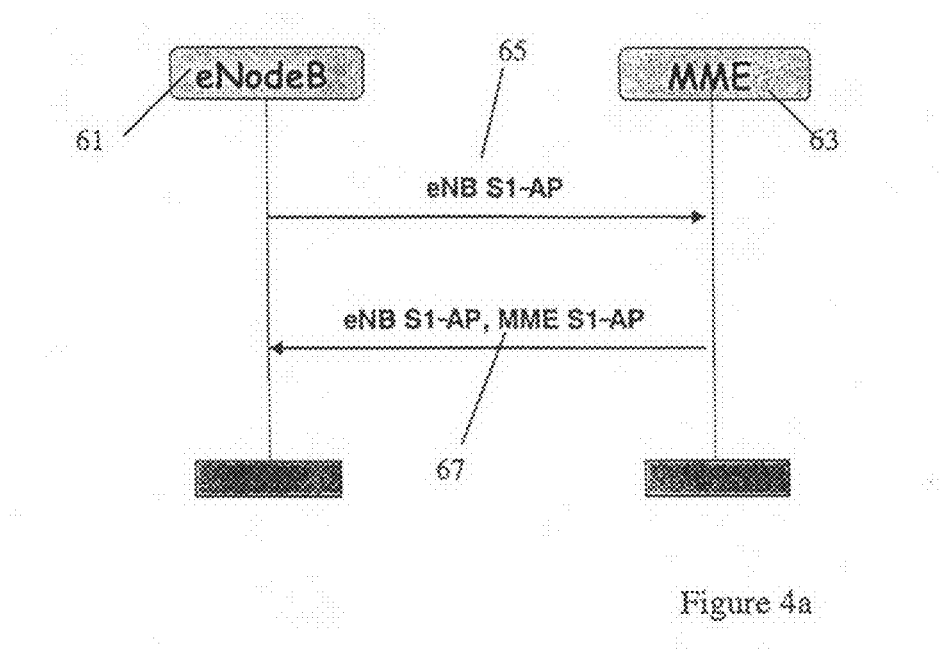
FIG. 4a schematically illustrates the establishment of a connection between an eNodeB and an MME component.
Figure 4B:
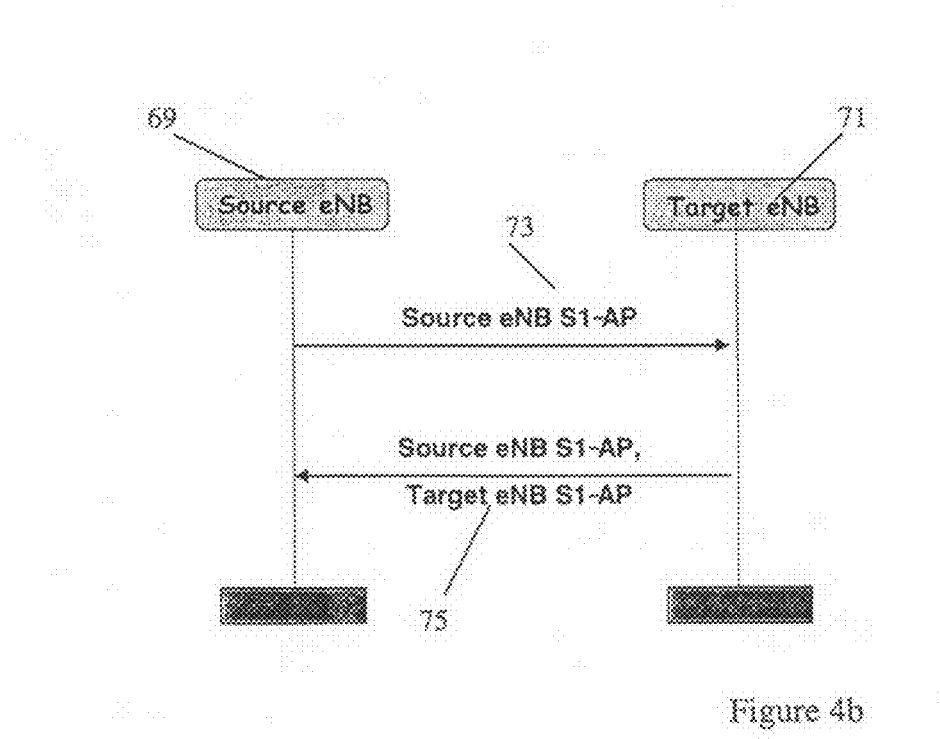
FIG. 4b schematically illustrates the establishment of a connection between two eNodeBs.

When a sending node requests, in some cases implicitly, the establishment of a dedicated S1/X2 signalling connection for a certain UE, e.g. by sending an S1-AP Initial UE message, it informs the peer node on the S1/X2 interface the application (AP) identifier it has assigned for that UE. In the case of a connection between an eNodeB 61 and an MME 63, this message takes the form "eNB S1-AP" 65 as shown in FIG. 4a, which may also be written as "eNB S1-AP UE ID". For a transfer from one eNodeB 69 to a peer eNodeB 71, the message is of the form "Source eNB S1-AP" 73 as shown in FIG. 4b. The response message of the peer node then contains the S1/X2 Application Identifier of both the originating and the peer node, for example "eNB S1-AP, MME S1-AP" 67 as in FIG. 4a, which may also be written as "eNB S1-AP UE ID, MME S1-AP UE ID" or, in the case shown in FIG. 4b "Source eNB S1-AP, Target eNB S1-AP" 75.

Further details of the application identifiers used in the S1 and X2 interfaces are provided below:

eNodeB S1-AP UE Identity

The eNodeB S1-AP UE Identity 65 is allocated to uniquely identify the UE over the S1 interface within the eNodeB 61. When an MME 63 receives the eNodeB S1-AP UE Identity 65, it stores it for the duration of the UE-associated logical S1 connection for this UE. Once known to the MME 63, this Identity (IE) may be included in all UE associated S1-AP signalling (uplink (UL) as well as downlink (DL)).

MME S1-AP UE Identity

The MME S1-AP UE Identity 67 is allocated to uniquely identify the UE over the S1 interface within the MME 63. When the eNodeB 61 receives the MME S1-AP UE Identity it stores it for the duration of the UE-associated logical S1 connection for this UE. Once known to the eNodeB, 61 the IE may be included in all UE associated S1-AP signalling (UL as well as DL).

Source eNodeB UE Context ID

The source eNodeB UE Context ID (Source eNB S1-AP) 73 is allocated to uniquely identify the UE over the X2 interface with the source eNodeB 69. When the target eNodeB 71 receives the source eNodeB context ID, it stores it for the duration of the context for that UE. Once known to the target eNodeB 71, the IE may be included in all UE associated X2-AP signalling.

Target eNodeB UE Context ID

The target eNodeB UE Context ID (Target eNB S1-AP) 75 is allocated to uniquely identify the UE over the X2 interface with the target eNodeB 71. When the source eNodeB 69 receives the target eNodeB context ID, it stores it for the duration of the context for that UE. Once known to the source eNodeB 69, the IE may be included in all UE associated X2-AP signalling.

Hence, as set out above, in previous embodiments, the Application Identifiers (AP IDs) are unique within the generating node. As a consequence, they may not be uniquely identified at the receiving peer node when it receives the first message (i.e. before the signalling connection exists). There are described below some scenarios depicting potential error situations in cases in which the application identifier is not unique in the receiving node.

In some situations, errors occur due to a node receiving two messages for triggering the establishment of an S1 or X2 connection containing the same S1/X2 application identifier from the originating node.

Figure 5:
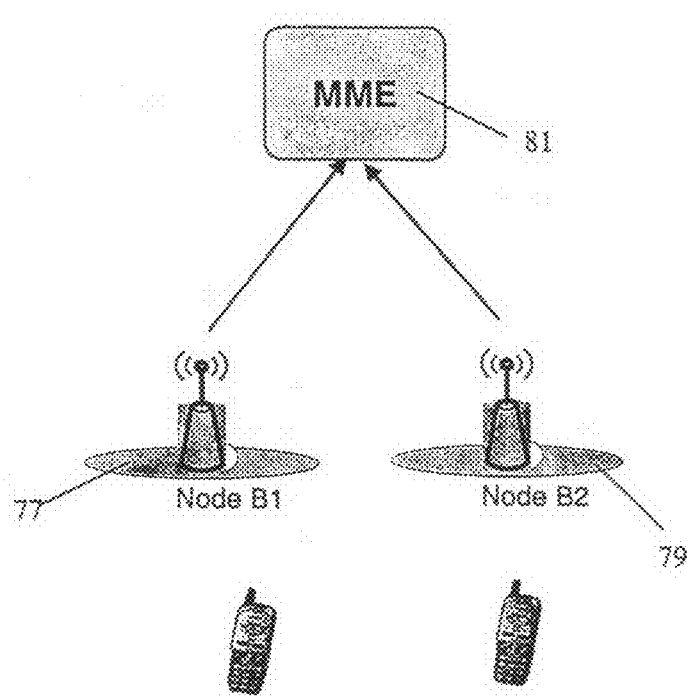
FIG. 5 schematically illustrates a potential error situation that may arise in a prior art system.

A first error situation will be described with reference to FIG. 5. In FIG. 5, two eNodeBs 77, 79 are connected to the same MME 81. The MME 81 receives two S1-AP Initial UE messages, which should trigger the establishment of two S1 connections. However, the two eNodeBs 77, 79 have by chance assigned the same eNB S1-AP UE identity to the messages. The application layer in the MME 81 produces an error since it cannot make a distinction between the two messages. Error handling is then undertaken by the system, which may result in a delay in connections being established or a failure to establish at least one connection.

Figure 6:
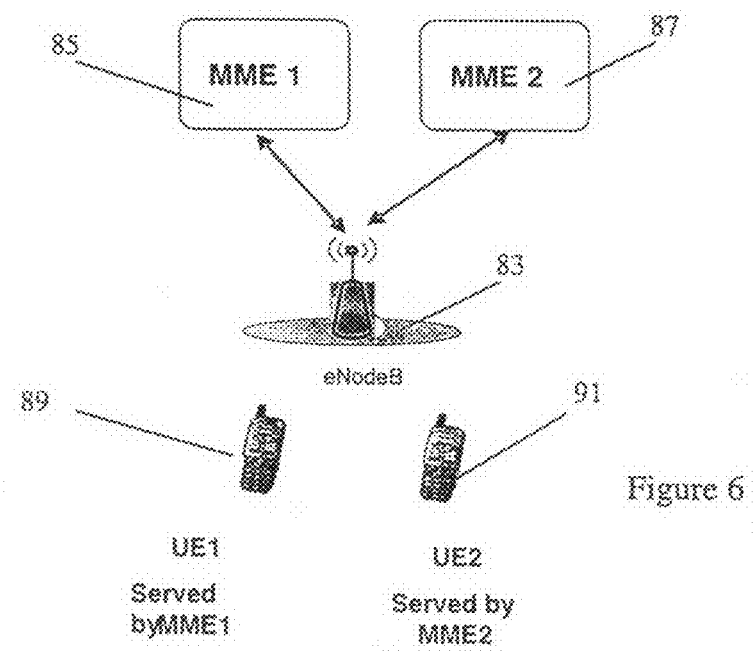
FIG. 6 schematically illustrates a second potential error situation that may arise in a prior art system.

A second potential error situation is illustrated in FIG. 6, which illustrates schematically a flex scenario. The eNodeB 83 is the target for both UE1 89 and UE2 91, served respectively by MME1 85 and MME2 87, during an intra LTE Handover with MME involvement. During the Handover process, the MME 85 sends to the target eNodeB 83 the S1-AP Handover Request message. The target eNodeB 83 may receive two S1-AP Handover Request messages from the two MMEs 85, 87 containing the same MME S1-AP UE Identity. The application layer in the target eNodeB 83 produces and error since it cannot make a distinction between the two messages. Error handling is then performed, which may cause delays and communication problems as above.

A further problem in the situation illustrated in FIG. 6 arises if an S1 Handover Cancel message is sent before the S1 Handover Request Acknowledgement is received. In this situation, the target eNodeB 83 will not know which resources to release.

Figure 7:
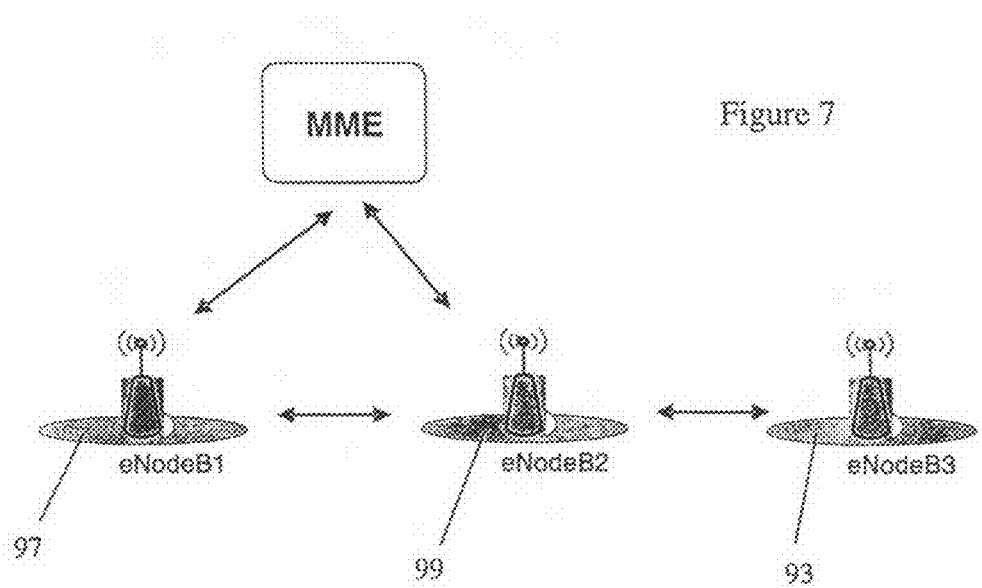
FIG. 7 schematically illustrates a third potential error situation that may arise in a prior art system.

A third potential error situation is illustrated in FIG. 7 which illustrates intra LTE mobility without MME involvement. In this situation, eNodeB2 99 is the target eNodeB for an intra LTE Handover triggered by eNodeB1 97 for an intra LTE Handover triggered by eNodeB3 93. As a consequence, eNodeB2 99 receives two X2 Handover Request messages from eNodeB1 97 and eNodeB3 93 which by chance use the same Source eNodeB UE Context ID. The application layer in the target eNodeB2 99 may get confused and cannot make a distinction between the two messages. Error handling is then performed to resolve the situation.

A further problem in the situation illustrated in FIG. 7 also arises if a Handover Cancel Request is received from eNodeB1 97 or eNodeB3 93 before eNodeB2 99 can reply to the original Handover Request. In this case, the eNodeB2 99 will not know which resources should be released.

Operation

To avoid situations such as those set out above, it has been appreciated that further identification of connection request messages would be helpful. This is implemented by enabling the S1 and X2 interfaces to use distinct application identifiers. This may be achieved in a number of different ways and these are summarised and described in more detail below.

Figure 8A:
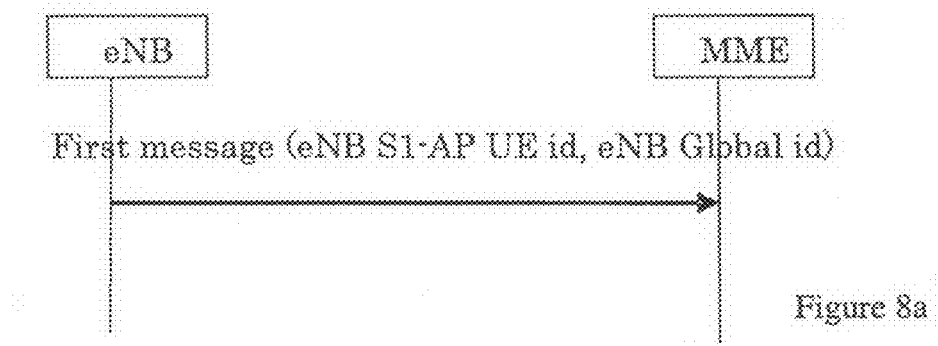
FIG. 8a is a schematic illustration of a first message from an eNodeB to an MME according to one embodiment.
Figure 8B:
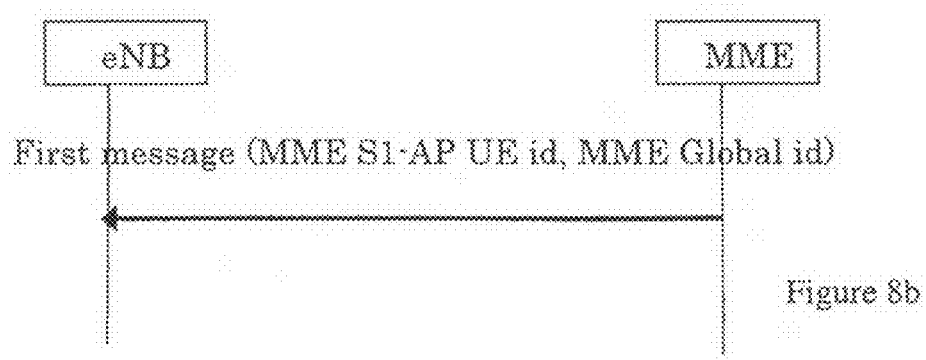
FIG. 8b is a schematic illustration of a first message from an MME to an eNodeB according to one embodiment.

In one embodiment, a new Node Identifier is added to the relevant S1/X2-AP messages. The Node Identifier may identify the source eNodeB or MME. In this embodiment, the Node Identifier is used only in the first message, in which the connection establishment is requested. The Node Identifier is not needed for the reply message and subsequent messages, which revert to exchanging only the application identifier. This reduces the amount of information (bits) that needs to be carried in the subsequent messages. This implementation is illustrated schematically in FIGS. 8a and 8b. FIG. 8a illustrates a first message from an eNodeB to an MME which includes both an eNB S1-AP UE id and an eNB Global id. FIG. 8b illustrates a first message from an MME to an eNodeB which includes both an MME S1-AP UE id and an MME Global id. Hence a predetermined number of bits are reserved in the initial S1-AP message to represent an identifier for the eNodeB or MME.

In an alternative embodiment, a Node Identifier is embedded inside the eNB/MME S1-AP identifier IE. That is, the connection request message includes a single identifier, but the identifier incorporates both information sufficient to identify the source node and information to identify the connection within the source node.

In a further embodiment, a new IE is added representing a logical identifier that is related by means of a well known function to a transport layer (TNL) identifier for the node, such as the IP address or SCTP port for the node. For example each eNodeB will have a different IP address and this may be used to derive a source node identifier. It is further noted that, in a typical implementation, the TNL does not inform the application protocol of the source IP address, thus the application protocol is agnostic of the sender ID unless it is indicated in the application message itself. This arises from the UMTS concept that the TNL and RNL should be implemented independently.

In a further implementation, the range of S1/X2-AP identifiers that one eNodeB or MME can assign is restricted so that the identifier ranges for two nodes do not overlap. This may be done, for example, by configuring a different range of identifiers for each eNodeB or MME during the pre-operational stage. Each node then cycles through its predefined range of identifiers as it establishes connections. This solution enables a unique application identifier to be provided from each node within one network. A further network identifier (such as the PLMN ID) may also be needed in some implementations where multiple networks are used to identify the network. This may be provided either embedded in the application identifier or as a separate identifier.

The implementation of a system according to any of the embodiments described above resolves the error situations set out above.

In the first error situation that was illustrated in FIG. 5, the addition or incorporation of an eNodeB identifier into each of the S1-AP Initial UE messages from eNodeB1 77 and eNodeB2 79 provides a unique identifier for each connection request received at the MME and hence enables the MME to provide a one-to-one mapping between the eNB S1-AP UE id and the MME S1-AP UE id.

Similarly, in the second error situation described in relation to FIG. 6, the addition or incorporation of an MME identifier into each of the MME S1-AP UE identifiers from MME1 85 and MME2 87 would uniquely identify the MME messages (and hence the originating MMEs) at the eNodeB 83. Further, if the handover request was cancelled, since the MMEs are uniquely identified in the initial message, the eNodeB 83 would know which resources to release to enable a connection to be cancelled without affecting establishment of the other connection.

Finally, in the third error situation described in relation to FIG. 7, eNodeB1 and eNodeB3 would send X2-AP Handover Requests including source eNodeB identifiers. Hence eNodeB2 could uniquely identify each of the two source nodes and would know which resources to release if the handover request was cancelled.

In one embodiment, in the third situation described in relation to FIG. 7, the Handover Request message also contains an MME S1-AP UE identifier, which includes an identifier of the MME component for the S1 signalling connection. This enables the target eNodeB2 99 to contact the MME by looking to the MME S1-AP UE identifier.

The node identifiers incorporated in the connection setup messages may be globally unique or may be unique only within the telephone network in which the node operates, for example within the node's PLMN network. In one embodiment, a global node identifier may be provided by making use of both a node ID (which is unique within a PLMN) and a PLMN identifier. This would enable each S1/X2 AP to be unique even in a RAN sharing scenario.

The application identifiers for the connection are transmitted with the initial connection set up messages. To reduce the overhead in subsequent messages, node identifiers may be omitted from at least some of the messages subsequently sent within the connection.

As mentioned above, the establishment of a connection in a mobile telecommunications network may occur when a new mobile device (UE) enters the network, for example when the mobile device is switched on. New connections may also be established to enable handover as a mobile device moves within a network. Additionally, connections may be established due to configuration changes in the network nodes, for example if a new base station is added or an MME fails.

The generation of an application identifier may be achieved by providing a generator module that uses an algorithm to generate an application identifier dynamically. In an alternative embodiment, the application identifier may be retrieved from a memory or buffer and the node may cycle through using a sequence of different application identifiers for sequential connections.

To determine a node identifier, the node may simply retrieve a fixed identifier from storage in memory. Alternatively, the node may obtain its identifier from a generator module that dynamically generates a node identifier. As set out above, the node identifier may be based on a transport layer identifier for the node, such as an IP address for the node.

In one embodiment, the connection identifier is generated using the application identifier and the node identifier. In a further embodiment, the connection identifier is generated using the application identifier and the network identifier. In a third embodiment, the connection identifier is generated using the application identifier, the node identifier and the network identifier. The identifiers may be concatenated to form a single connection identifier or a function may be used to combine the identifiers. The use of a function to combine the identifiers may make the connection identifier shorter than it would be if the identifiers were concatenated. However, concatenation of the identifiers may enable individual identifiers to be removed from subsequent messages once the connection has been established.

GLOSSARY OF 3GPP TERMS

LTE—Long Term Evolution (of UTRAN)
eNodeB—E-UTRAN Node B
AGW—Access Gateway
UE—User Equipment—mobile communication device
DL—downlink—link from base to mobile
UL—uplink—link from mobile to base
AM—Acknowledge Mode
UM—Unacknowledge Mode
MME—Mobility Management Entity
UPE—User Plane Entity
HO—Handover
RLC—Radio Link Control
RRC—Radio Resource Control
RRM—Radio Resource Management
SDU—Service Data Unit
PDU—Protocol Data Unit
NAS—Non Access Stratum
ROHC—Robust Header Compression
TA—Tracking Area
U-plane—User Plane
TNL—Transport Network Layer
S1 Interface—Interface between Access Gateway and eNodeB
X2 Interface—Interface between two eNodeB
MMEs/SAE Gateway—New name for Access Gateway having both MME and UPE entities The following is a detailed description of the way in which the present inventions may be implemented in the currently proposed 3GPP LTE standard. Whilst various features are described as being essential or necessary, this may only be the case for the proposed 3GPP LTE standard, for example due to other requirements imposed by the standard. These statements should not, therefore, be construed as limiting the present invention in any way.

Title: Use of Global Node Id in Support of Application Routing

1 SCOPE

The scope of this contribution is to:
highlight some error scenarios which are caused by the S1/X2 application identifier not being globally unique
propose several solutions to overcame this issue

2 DISCUSSION 2.1 Current status

An SCTP connection carries signalling related to different UEs. In order to forward internally the signalling to the correct UE context manager, application routing information must be included in the S1/X2 AP messages.

Whenever a sending node requests implicitly the establishment of a dedicated S1/X2 signalling connection for a certain UE, by e.g. sending the S1-AP Initial UE message, it will inform the peer node on the S1/X2 AP identifier it has assigned for that UE.

The response message of the peer node will contain, in a normal scenario, the S1/X2 application id of both originating and peer node (see FIGS. 4a & 4b).

See below definitions of Application identifier in both S1 and X2 interface [1]:
eNB S1-AP UE Identity:
   The eNB S1-AP UE Identity shall be allocated so as to uniquely identify the UE over the S1 interface within the eNB. When MME receives eNB S1-AP UE Identity it shall store it for the duration of the UE-associated logical S1-connection for this UE. Once known to MME this IE is included in all UE associated S1-AP signalling (UL as well as DL).
MME S1-AP UE Identity:
   The MME S1-AP UE Identity shall be allocated so as to uniquely identify the UE over the S1 interface within the MME. When eNB receives MME S1-AP UE Identity it shall store it for the duration of the UE-associated logical S1-connection for this UE. Once known to eNB this IE is included in all UE associated S1-AP signalling (UL as well as DL).
Source eNB UE Context ID:
   The source eNB UE Context ID shall be allocated so as to uniquely identify the UE over the X2 interface within the source eNB. When target eNB receives source eNB UE Context ID it shall store it for the duration of the context for this UE. Once known to target eNB this IE is included in all UE associated X2-AP signalling.
Target eNB UE Context ID:
   The Target eNB UE Context ID shall be allocated so as to uniquely identify the UE over the X2 interface within the target eNB. When target eNB receives target eNB UE Context ID it shall store it for the duration of the context for this UE. Once known to source eNB this IE is included in all UE associated X2-AP signalling.

The exact definitions are not yet agreed but it is well known/agreed among the 3GPP groups that these application identifiers are unique within the generating node.

According to the definitions above these AP ids, are unique within the generating node. As a consequence they are not univocally identified at the receiving peer node when it receives the first message (i.e. signalling connection does not exist) unless some node-specific identifier are also present in the message. In the paragraph 2.3 some scenarios, depicting the potential error situation in case of the application id is not globally unique, are explained.

2.2 T-Plane Identifiers

Since Control Plane relies on SCTP over IP on both S1 and X2 interface, following TNL identifiers exist:

SCTP Layer:
Source Port Number, Destination Port Number
SCTP stream id

IP Layer:
Source/destination IP address

In LTE there will be one SCTP association for each S1/X2 interface, with one pair of SCTP streams for common procedure and few pairs of SCTP streams to be shared by all S1/X2 dedicated signalling connections.

The SCTP Source port in combination with the source IP address, the SCTP destination port and possibly the destination IP address is used to identify the association to which this packet belongs.

As a consequence, the SCTP association may be used as node identifier (SCTP stream id is not useful for this purpose).

However, in line with the UMTS principle, it is proposed not to use the TNL identifier (i.e. SCTP association) for application protocol purpose in order to keep the RNL and TNL as much independent as possible and to avoid any implementation constraints for e.g. blade/SW entities communication.

2.3 Potential Error Situation Scenarios

This paragraph lists some possible scenarios which may lead to an error situation in a peer node receiving two messages (which trigger the establishment of S1/X2 connection) containing the same S1/X2 application identifier the originating node.

1) In FIG. 5, two eNBs are connected to the same MME: the MME receives two S1-AP Initial UE messages (which should trigger the establishment of the S1 connection), from 2 different eNBs which by chance have assigned the same eNB S1-AP UE Identity.

The application layer in the MME will get confused and, since the message does not contain any information related to the originating node, it cannot make a distinction between the two messages. Error handling will then be performed according to the implementation. This could be avoided by using an S1-AP identifier which is globally unique.

2) In FIG. 6, an S1 flex scenario is depicted: the eNB is the target eNB for both UE1 and UE2, served respectively by MME1 and MME2, during an Intra LTE Handover with the MME involvement. During the Handover preparation, the MME sends to the target eNB the S1-AP: Handover Request message. The target eNB may receive two S1-AP: Handover Request messages from the two different MMEs containing the same MME S1-AP UE Identity.

The application layer in the target eNB will get confused and, if the message does not contain any information related to the originating node it cannot make a distinction between the two messages. Error handling will then be performed according to the implementation. This could be avoided by using an S1-AP identifier which is globally unique.

3) In FIG. 7, eNode B2 is the target eNB for the Intra LTE Handover triggered by eNB1 and the Intra LTE Handover triggered by eNB3. As a consequence the eNB2 may receive two X2: Handover Request messages from eNB1 and eNB3 which by chance have assigned the same Source eNB UE Context ID.

The application layer in the target eNB2 will get confused and, since the message does not contain any information related to the originating node, it cannot make a distinction between the two messages. Error handling will then be performed according to the implementation. This could be avoided by using a Source eNB UE Context ID (i.e. X2 AP identifier) which is globally unique.

2.4 Proposals

In order to avoid these misleading situations, it is proposed to use a globally unique application id on both S1 and X2 interfaces. This may be reached in different ways:

Solution One:
Add a new IE, i.e. Global Node id, in the relevant S1/X2-AP messages Solution Two:
Embedding the Global Node id inside the eNB/MME S1-AP identifier IE Solution 3:
Add a new IE representing a logical identifier which somehow is related (by mean of a well known function) to TNL identifier (IP address/SCTP port)

Solution 4:
Restrict the range of S1/X2 AP identifiers that one eNB can assign so that the range of the two different nodes do not overlap (by e.g. configuring a different range for each eNB during the pre-operational state). This solution however will allow having a unique AP-id within one network. As a consequence a network identifier (i.e. PLMN id) is needed either embedded in the AP-id IE or as a separate IE. In case of a separate IE, this will be needed only in the message triggering the connection establishment.

Solution one and two rely on the concept of Global node identifier which make use of:

Node id (unique within one PLMN) and PLMN identifier (this guarantee that the S1/X2 AP are unique even in a RAN sharing scenario).

The first three solutions differ in terms of implementation complexity: NEC preference is Solution 1.

In case of solution one, the Global Node id will be needed only for the first message. Global Node id is not needed for the reply message neither for subsequent messages.

Therefore, amount/bits of information that needs to be carried in the subsequent messages can be reduced by applying solution one.

The fourth solution requires some configuration to be done in the nodes in a pre-operational state.

3 CONCLUSION

This contribution has pointed out some potential error scenarios due to the S1/X2-AP ids not being globally unique.

Four proposals have been made to overcome this issue i.e.:
Introduction of Global Node id IE in relevant S1/X2 messages
Embedding of the Global node id in the S1-AP id IE
Add a new IE representing a logical identifier related to TNL identifiers
S1-AP range configuration in each eNB in combination with a network identifier (either as a separate IE or embedded in the AP id IE).

It is proposed to discuss the consequences of not having a unique application id and to agree on one of the proposals listed in paragraph 2.4.

If the principle is accepted, NEC is available in writing the related CR.

4 REFERENCE

R3-071344 "Discussion and proposal for the AP ID handling", NEC

This application is based upon and claims the benefit of priority from United Kingdom Patent Application No. 0715940.3, filed on Aug. 15, 2007, the disclosure of which is incorporated herein in its entirety by reference.

The invention claimed is:

1. A method, performed by a source node comprising a first base station, for establishing a requested connection between the source node and a destination node comprising a second base station in a cellular telecommunications network, the method comprising:
   generating a source application layer identifier for the connection within the source node, wherein said source application layer identifier is configured to identify user equipment associated with said source node;
   retrieving a source node identifier for the source node; and
   transmitting, from the source node comprising the first base station, the source application layer identifier and the source node identifier to the destination node comprising the second base station, to provide a source connection identifier for the requested connection between the source node and the destination node.

2. A method according to claim 1 further comprising:
   receiving a connection reply message, the reply message comprising a destination connection identifier,
   the destination connection identifier comprising a destination application layer identifier for the connection within the destination node and a destination node identifier.

3. A method according to claim 2, wherein the destination node identifier is unique within the telecommunications network.

4. A method according to claim 2, wherein the destination node identifier is globally unique.

5. A method according to claim 2, wherein the destination node identifier comprises an identifier of the destination network and an identifier of the destination node within the destination network.

6. A method according to claim 2, wherein the destination connection identifier comprises the destination node identifier pre-pended or post-pended to the destination application layer identifier.

7. A method according to claim 2, wherein the destination connection identifier comprises the destination application layer identifier with the destination node identifier embedded therein.

8. A method according to claim 2, wherein the destination node identifier is based on a transport layer identifier for the destination node.

9. A method according to claim 1, wherein the source node identifier is unique within the telecommunications network.

10. A method according to claim 1, wherein the source node identifier is globally unique.

11. A method according to claim 1, wherein the source node identifier comprises an identifier of at least a portion of the source network and an identifier of the source node within the at least a portion of the source network.

12. A method according to claim 1, wherein the source connection identifier comprises the source node identifier pre-pended or post-pended to the source application layer identifier.

13. A method according to claim 1, wherein the source connection identifier comprises the source application layer identifier with the source node identifier embedded therein.

14. A method according to claim 1, wherein the source node identifier is based on a transport layer identifier for the source node.

15. A non-transitory computer-readable storage medium comprising instructions for carrying out a method according to claim 1.

16. A method according to claim 1, performed by a source node, wherein said source application layer identifier is configured to identify user equipment associated with said source node.

17. An apparatus comprising a source node comprising a first base station for originating a connection to a destination node comprising a second base station of a cellular telecommunications network, the source node comprising:
   a generator to generate a source application layer identifier, wherein said source application layer identifier is configured to identify user equipment associated with said source node;
   a controller operable to retrieve a source node identifier; and
   a transmitter operable to transmit, from the source node comprising the first base station, the source application layer identifier and the source node identifier to the destination node comprising the second base station to provide a source connection identifier for the requested connection between the source node and the destination node.

18. An apparatus according to claim 17 further comprising a receiver for receiving a connection reply message, the reply message comprising a destination connection identifier, the destination connection identifier comprising a destination application layer identifier for a connection within the destination node and a destination node identifier.

19. An apparatus comprising a source node comprising a first base station for originating a connection to a destination node comprising a second base station of a cellular telecommunications network, the source node being operable under program control to:
   generate a source application layer identifier, wherein said source application layer identifier is configured to identify user equipment associated with said source code;
   retrieve a source node identifier; and
   transmit the source application layer identifier and the source node identifier to the destination node to provide a source connection identifier for the requested connection between the source node and the destination node.

20. A method for establishing a connection between a source node comprising a first base station and a destination node comprising a second base station in a cellular telecommunications network by transmitting a connection request message, the message having a source application layer identifier for the connection within the source node comprising the first base station, wherein said source application layer identifier is configured to identify user equipment associated with said source node comprising said first base station; and
   wherein the message further comprises a source node identifier for the source node comprising said first base station.

21. A system comprising a source node comprising a first base station and a destination node comprising a second base station of a cellular telecommunications network, said source node being operable to transmit a connection request message, the message having a source application layer identifier for the connection within the source node comprising said first base station, wherein said source application layer identifier is configured to identify user equipment associated with said source node comprising said first base station; and
   wherein the message further comprises a source node identifier for the source node.

* * * * *